(12) United States Patent
Ito et al.

(10) Patent No.: US 9,393,546 B2
(45) Date of Patent: Jul. 19, 2016

(54) WATER ABSORBING MATERIAL AND MANUFACTURING METHOD THEREOF

(71) Applicant: DAIKI CO., LTD., Tokyo (JP)

(72) Inventors: Hiroshi Ito, Tokyo (JP); Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 14/833,697

(22) Filed: Aug. 24, 2015

(65) Prior Publication Data

US 2015/0360200 A1    Dec. 17, 2015

Related U.S. Application Data

(63) Continuation of application No. PCT/JP2013/063180, filed on May 10, 2013.

(51) Int. Cl.
| | |
|---|---|
| *B01J 20/26* | (2006.01) |
| *B01J 20/22* | (2006.01) |
| *B07B 1/24* | (2006.01) |
| *A01K 1/015* | (2006.01) |
| *B03B 9/06* | (2006.01) |
| *B01J 20/32* | (2006.01) |
| *B01J 20/30* | (2006.01) |
| *B29B 17/02* | (2006.01) |
| *B29L 31/48* | (2006.01) |

(52) U.S. Cl.
CPC ............... *B01J 20/22* (2013.01); *A01K 1/0155* (2013.01); *B01J 20/3028* (2013.01); *B01J 20/3293* (2013.01); *B03B 9/061* (2013.01); *B07B 1/24* (2013.01); *B29B 17/02* (2013.01); *B01J 2220/4831* (2013.01); *B01J 2220/68* (2013.01); *B29L 2031/4878* (2013.01); *Y02W 30/523* (2015.05)

(58) Field of Classification Search
CPC ....................................................... B01J 20/26
USPC ........................................................ 502/402
See application file for complete search history.

(56) References Cited

FOREIGN PATENT DOCUMENTS

| | | |
|---|---|---|
| JP | 2003-039023 A | 2/2003 |
| JP | 2003-219746 A | 8/2003 |
| JP | 2006-333773 A | 12/2006 |

OTHER PUBLICATIONS

Aug. 13, 2013 International Search Report issued in International Patent Application No. PCT/JP2013/063180.
Aug. 13, 2013 Written Opinion issued in International Patent Application No. PCT/JP2013/063180.

*Primary Examiner* — Edward Johnson
(74) *Attorney, Agent, or Firm* — Oliff PLC

(57) ABSTRACT

A water absorbing material contains a water-absorbent material consisting of at least one of plastic and fluff pulp that are obtained by separating a water-absorbent polymer from a sanitary article containing the plastic, the fluff pulp and the water-absorbent polymer. The weight ratio of the water-absorbent polymer adhering to the water-absorbent material with respect to the water-absorbent material is 3% or less.

20 Claims, 12 Drawing Sheets

WATER ABSORBING MATERIAL AND MANUFACTURING METHOD THEREOF

CROSS REFERENCE TO RELATED APPLICATION

This is a Continuation of International Application No. PCT/H2013/063180 filed May 10, 2013. The contents of this application are hereby incorporated by reference in their entirety.

TECHNICAL FIELD

The present invention relates to a water absorbing material that absorbs liquid such as excrement of humans or animals, and a manufacturing method of the water absorbing material.

BACKGROUND ART

Patent Document 1 describes an excrement treatment material that is a type of water absorbing material. In the excrement treatment material, pulverized pieces of a waste disposable diaper are used as a raw material. Patent Document 1: JP2006-333773A

SUMMARY OF INVENTION

Technical Problem

Employing a raw material obtained from a waste sanitary article such as waste disposable diaper contributes to reduction of procuring cost of raw materials and eventually reduction of manufacturing cost of the water absorbing material. However, a water-absorbent polymer having been contained in the sanitary article adheres to such raw material. In the case where a lot of water-absorbent polymers adhere to a raw material constituting a water absorbing material, the water absorbing material after absorbing liquid is liable to break from inside because the swell of the water-absorbent polymers excessively occurs. This leads to deterioration in quality of the water absorbing material.

Solution to Problem

The present invention was made in view of the above-described problems, and it is an object thereof to provide a water absorbing material which can be manufactured at low cost without causing deterioration in quality, and a manufacturing method of the water absorbing material.

A water absorbing material according to the present invention contains a water-absorbent material consisting of at least one of plastic and fluff pulp that are obtained by separating a water-absorbent polymer from a sanitary article containing the plastic, the fluff pulp and the water-absorbent polymer, wherein a weight ratio of the water-absorbent polymer adhering to the water-absorbent material with respect to the water-absorbent material is 3% or less.

In this water absorbing material, the water-absorbent material consisting of at least one of plastic and fluff pulp that are obtained by separating a water-absorbent polymer from a sanitary article is employed. Thus, the water-absorbent material can be obtained from a waste sanitary article, and therefore it is possible to reduce procuring cost of raw materials and eventually reduce manufacturing cost of the water absorbing material. Moreover, because the weight ratio of the water-absorbent polymer remaining on the water-absorbent material is only 3% or less, it is possible to prevent deterioration in quality of the water absorbing material.

A manufacturing method of a water absorbing material according to the present invention includes an obtaining step of separating a water-absorbent polymer from a sanitary article containing plastic, fluff pulp and the water-absorbent polymer to obtain a water-absorbent material consisting of at least one of the plastic and the fluff pulp, and a granulating step of granulating the water-absorbent material obtained in the obtaining step, wherein in the obtaining step, the water-absorbent polymer is separated from the sanitary article so that a weight ratio of the water-absorbent polymer adhering to the water-absorbent material with respect to the water-absorbent material will be 3% or less.

In this manufacturing method, the water-absorbent material consisting of at least one of plastic and fluff pulp that are obtained by separating a water-absorbent polymer from a sanitary article is employed. Thus, the water-absorbent material can be obtained from a waste sanitary article, and therefore it is possible to reduce procuring cost of raw materials and eventually reduce manufacturing cost of the water absorbing material. Moreover, because the weight ratio of the water-absorbent polymer remaining on the water-absorbent material is only 3% or less, it is possible to prevent deterioration in quality of the water absorbing material.

Advantageous Effects of Invention

According to the present invention, a water absorbing material which can be manufactured at low cost without causing deterioration in quality, and a manufacturing method of the water absorbing material are realized.

Figure 2:
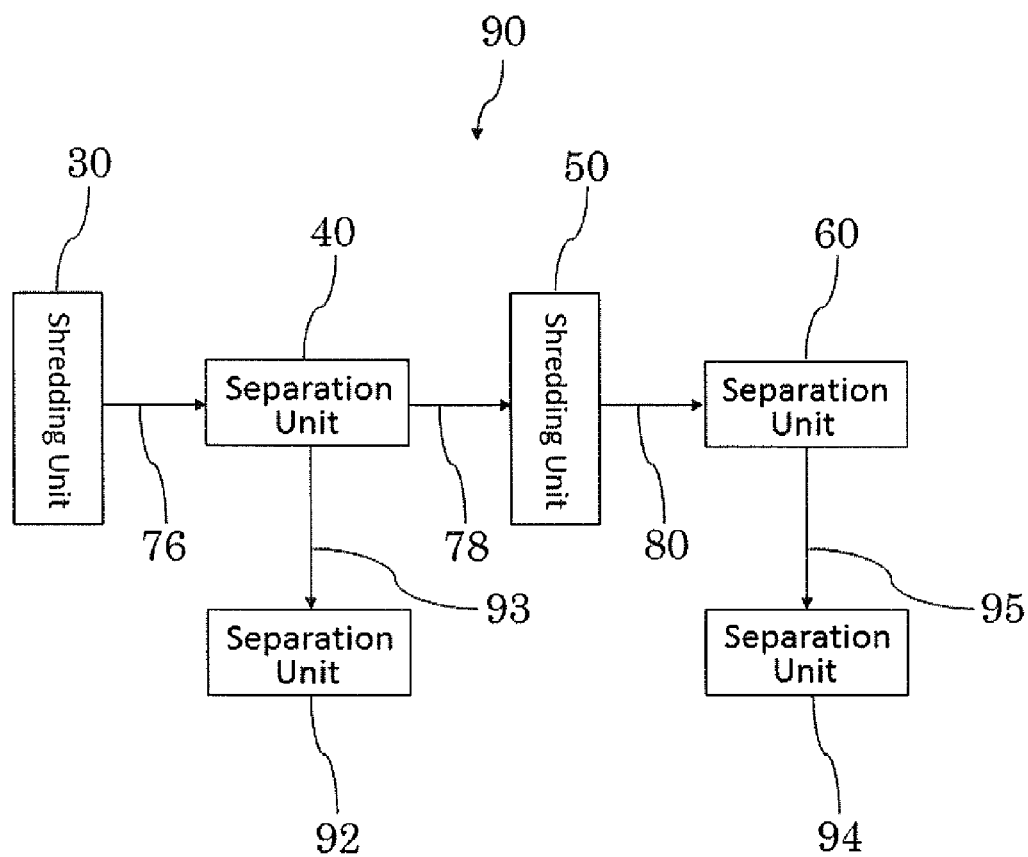
FIG. 2 is a configuration diagram showing an embodiment of a separation device according to the present invention.

FIG, 8 is a cross-sectional view showing a transfer path 78 of the separation device in FIG. 2.

Figure 9:
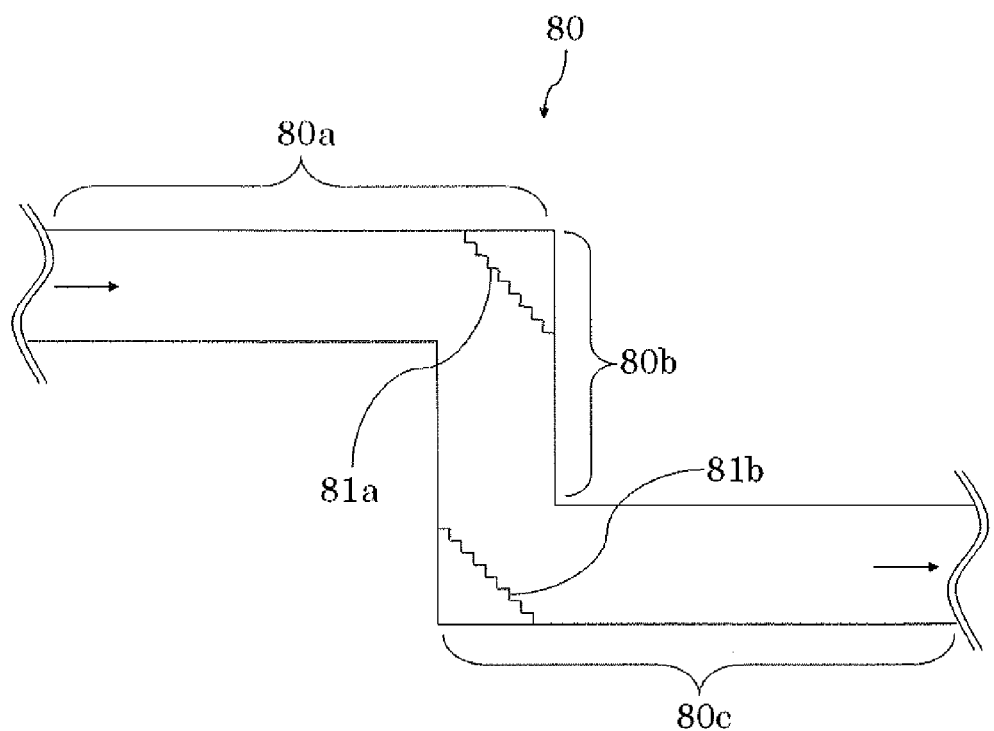

FIG. 9 is a cross-sectional view showing a transfer path 80 of the separation device in FIG. 2.

Figure 4:
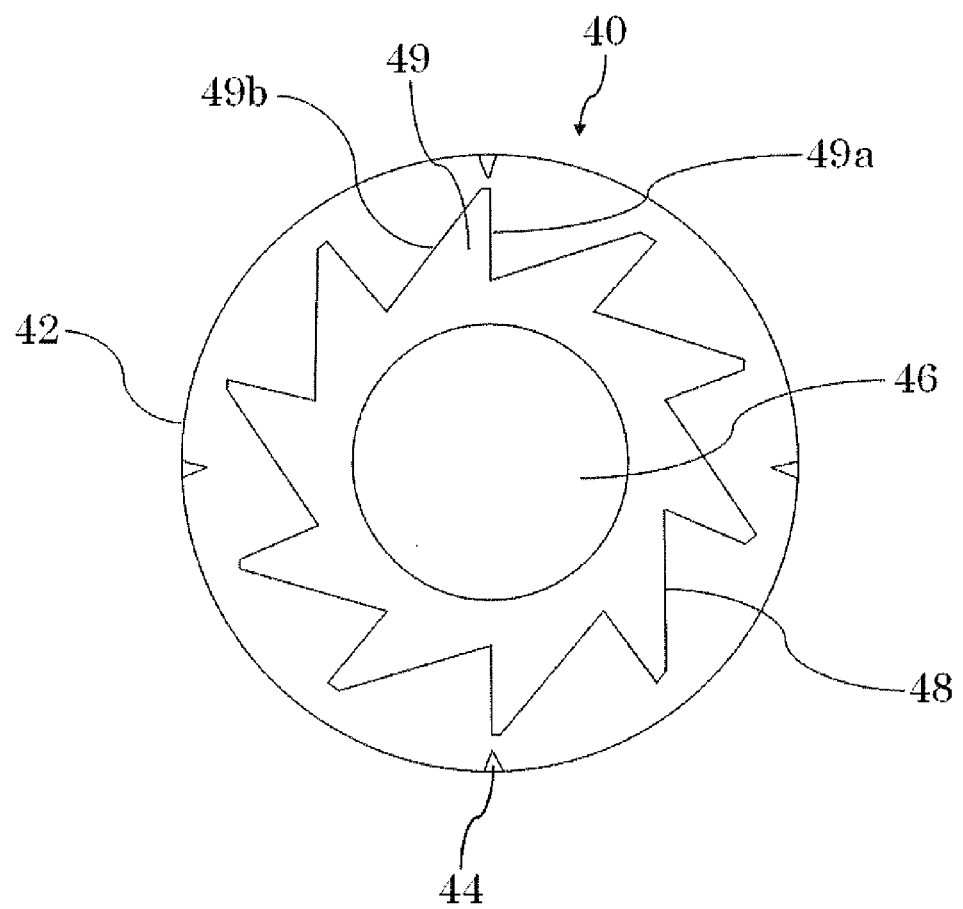
FIG. 4 is a cross-sectional view taken along line IV-IV in FIG. 3.
Figure 10:
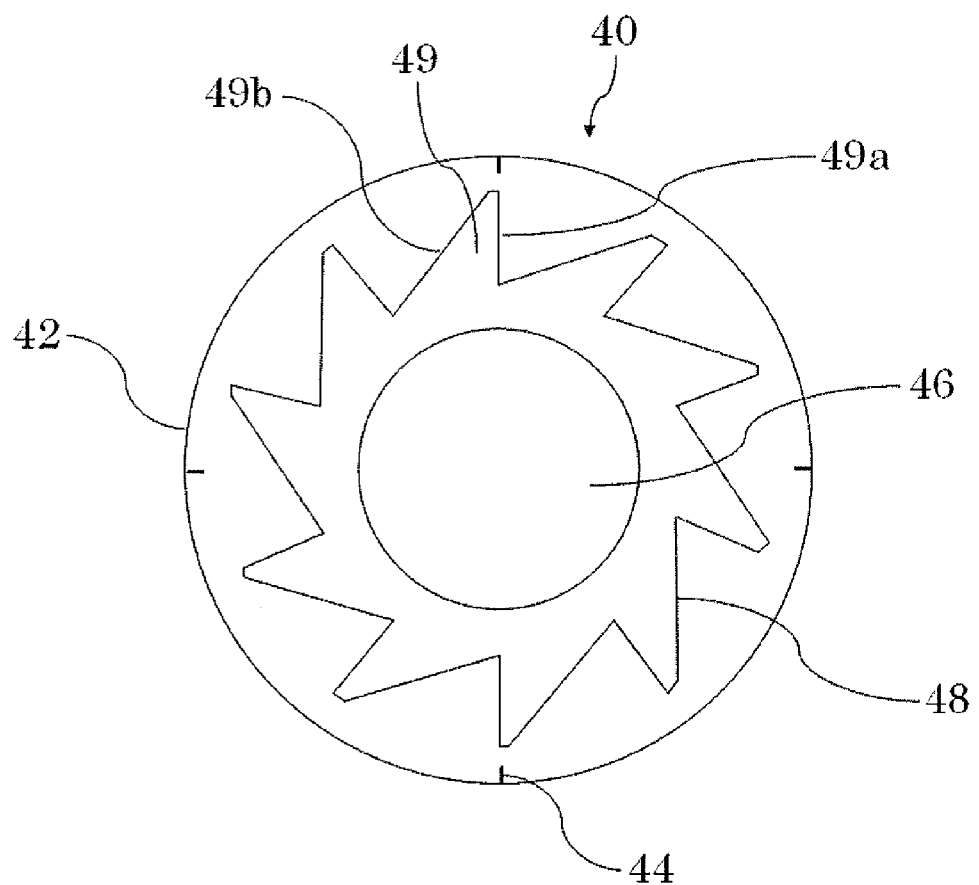

FIG. 10 is a cross-sectional view for explaining a modification of a ridge 44 shown in FIG. 4.

Figure 7:
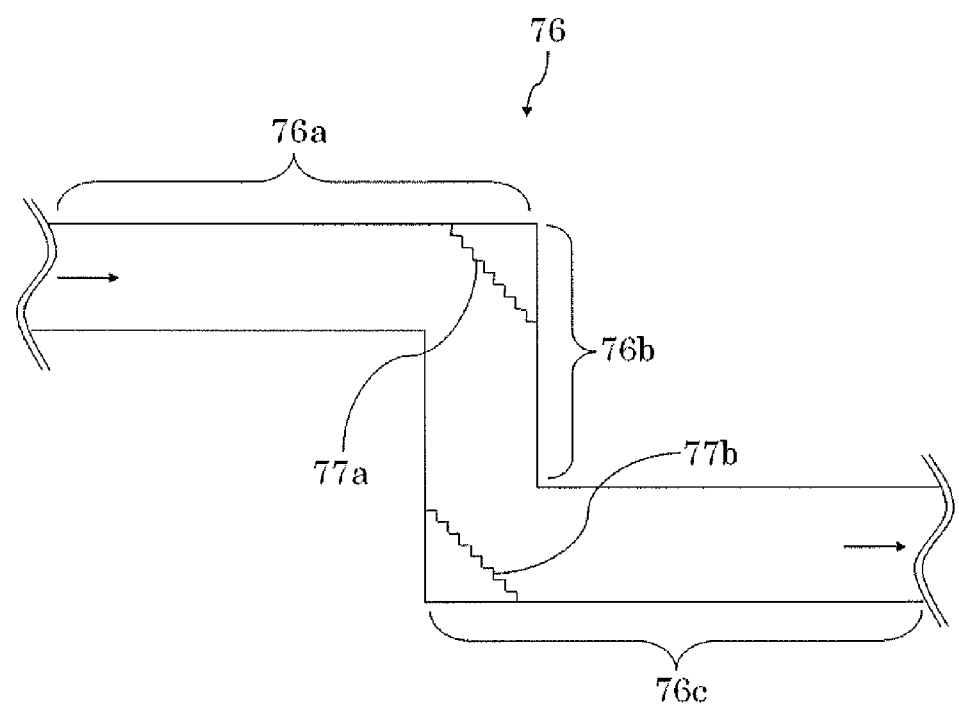
FIG. 7 is a cross-sectional view showing a transfer path 76 of the separation device in FIG. 2.
Figure 11:
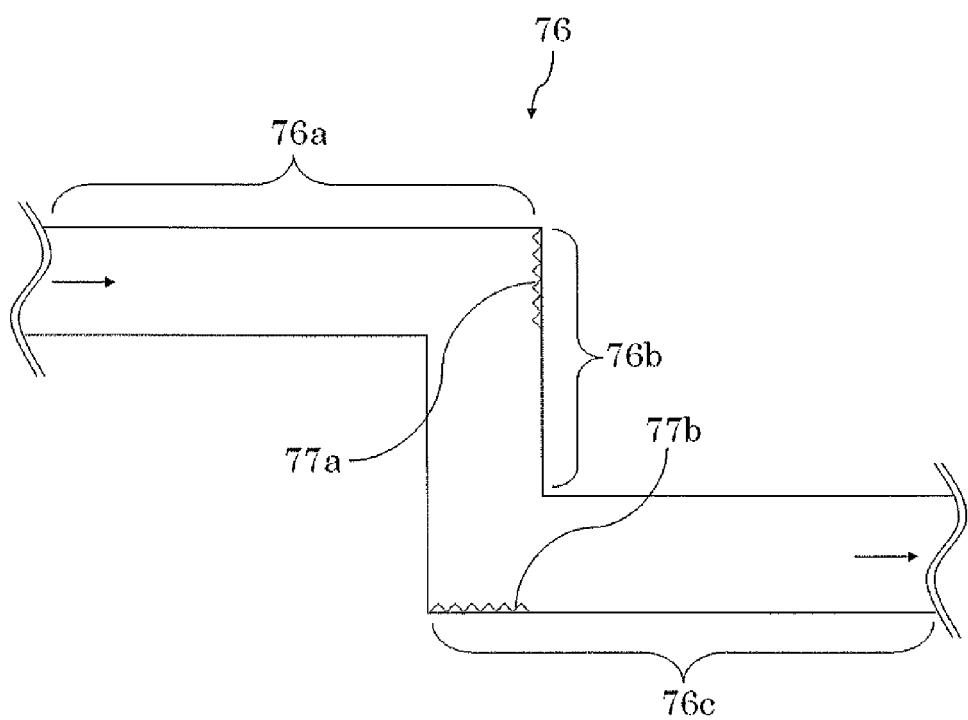

FIG. 11 is a cross-sectional view for explaining a modification of an uneven surface 77a and an uneven surface 77b shown in FIG. 7.

Figure 12:
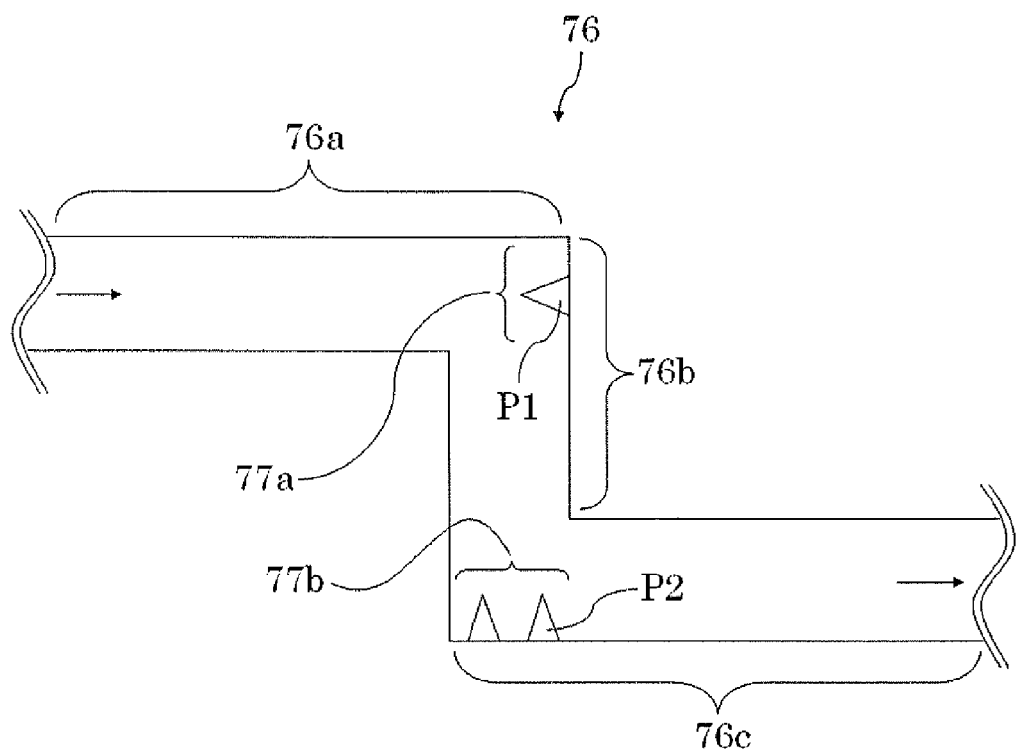

FIG. 12 is a cross-sectional view for explaining a modification of the uneven surface 77a and the uneven surface 77b shown in FIG. 7.

DESCRIPTION OF EMBODIMENTS

Hereinafter, embodiments of the present invention will be described in detail with reference to the drawings. It should be noted that the description of the drawings denotes like elements by like reference numerals and omits redundant descriptions.

Figure 1:
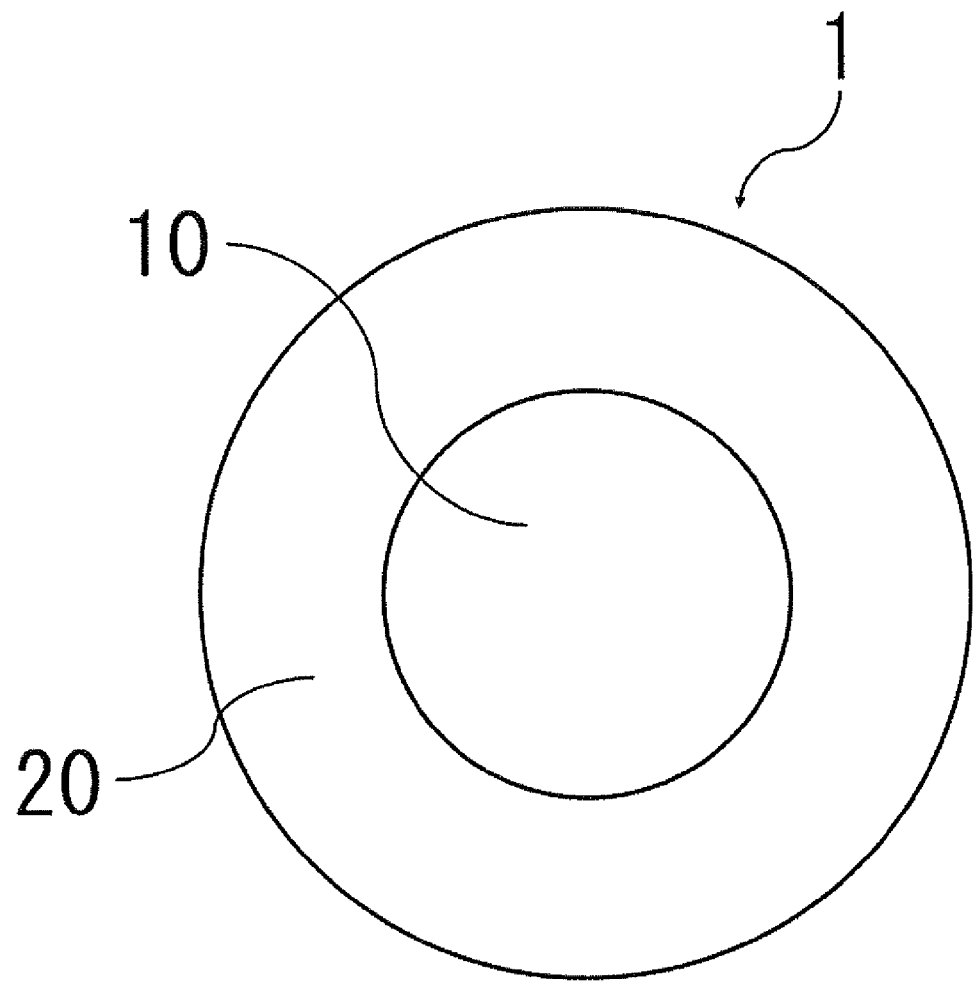
FIG. 1 is a schematic view of an embodiment of a water absorbing material according to the present invention.

FIG. 1 is a schematic view of an embodiment of a water absorbing material according to the present invention. A water absorbing material 1 is an excrement treatment material for a pet animal such as cat and dog, and includes a granular core portion 10 and a coating layer portion 20.

The granular core portion 10 has a function of absorbing and retaining liquid. The granular core portion 10 contains a water-absorbent material consisting of at least one of plastic and fluff pulp that are derived from a sanitary article. That is, the granular core portion 10 may contain either of the plastic or the fluff pulp, or may contain both of them.

Specifically, the plastic and the fluff pulp are obtained by separating a water-absorbent polymer (including a highly water-absorbent polymer; the same shall apply hereinafter) from a sanitary article containing the plastic, the fluff pulp and the water-absorbent polymer. Such separation is performed by a separation device mentioned later. The sanitary article is, for example, disposable diaper, sanitary napkin, or urine absorbing pad. A waste sanitary article is preferably used as the sanitary article.

A small quantity of water-absorbent polymers adhere to the plastic and the fluff pulp, because it is hard to completely separate water-absorbent polymers from a sanitary article. However, in the water absorbing material 1, the weight ratio of the water-absorbent polymer adhering to the plastic with respect to the plastic is 3% or less (preferably 1% or less). Similarly, the weight ratio of the water-absorbent polymer adhering to the fluff pulp with respect to the fluff pulp is also 3% or less (preferably 1% or less). Accordingly, the weight ratio of the water-absorbent polymer adhering to the water-absorbent material consisting of at least one of the plastic and the fluff pulp with respect to the water-absorbent material is also 3% or less (preferably 1% or less).

Although plastic pieces adhere to the fluff pulp after separation in some cases, the weight ratio of the plastic pieces with respect to the fluff pulp is preferably 5% or less.

In the present embodiment, the water-absorbent material is a main material of the water absorbing material 1. Here, the main material of the water absorbing material 1 refers to the raw material whose weight ratio with respect to the water absorbing material 1 is the highest among all raw materials constituting the water absorbing material 1. The water-absorbent material is also a main material of the granular core portion 10. That is, the water-absorbent material has the highest weight ratio with respect to the granular core portion 10 among all raw materials constituting the granular core portion 10.

The coating layer portion 20 covers the granular core portion 10. The coating layer portion 20 may cover the entire surface of the granular core portion 10, or may cover only a part of the surface of the granular core portion 10. The coating layer portion 20 has a function (aggregate making function) of causing the water absorbing materials 1, which were wet with excrement such as urine in use, to adhere to each other so as to form an aggregate.

The coating layer portion 20 contains fluff pulp and a water-absorbent polymer. These fluff pulp and water-absorbent polymer are both derived from a sanitary article. That is, these fluff pulp and water-absorbent polymer are both separated from the sanitary article. The fluff pulp and the water-absorbent polymer contained in the coating layer portion 20 may be separated from each other, or may not be separated from each other.

In the present embodiment, each of the fluff pulp and the water-absorbent polymer contained in the coating layer portion 20 is pulverized so as to have a predetermined grain size. The fluff pulp is preferably pulverized so as to have a grain size of under 1 mm. The water-absorbent polymer is preferably pulverized so as to have a grain size of under 35 μm.

FIG. 2 is a configuration diagram showing a separation device used in the present embodiment. A separation device 90 processes a processing target containing a first material, a second material and a third material, thereby separating the second and third materials from the processing target and further separating the second and third materials from each other. In the present embodiment, the processing target is a sanitary article, the first material is plastic, the second material is fluff pulp, and the third material is a water-absorbent polymer.

The separation device 90 includes a shredding unit 30 (first shredding unit), a separation unit 40 (first rough separation unit), a separation unit 92 (first fine separation unit), a shredding unit 50 (second shredding unit), a separation unit 60 (second rough separation unit), and a separation unit 94 (second fine separation unit).

The shredding unit 30 shreds the sanitary article. For example, a crusher or a grinder can be used as the shredding unit 30. In the case where the sanitary article is a disposable diaper, for example, it is preferable that no screen is provided in the shredding unit 30.

Figure 3:
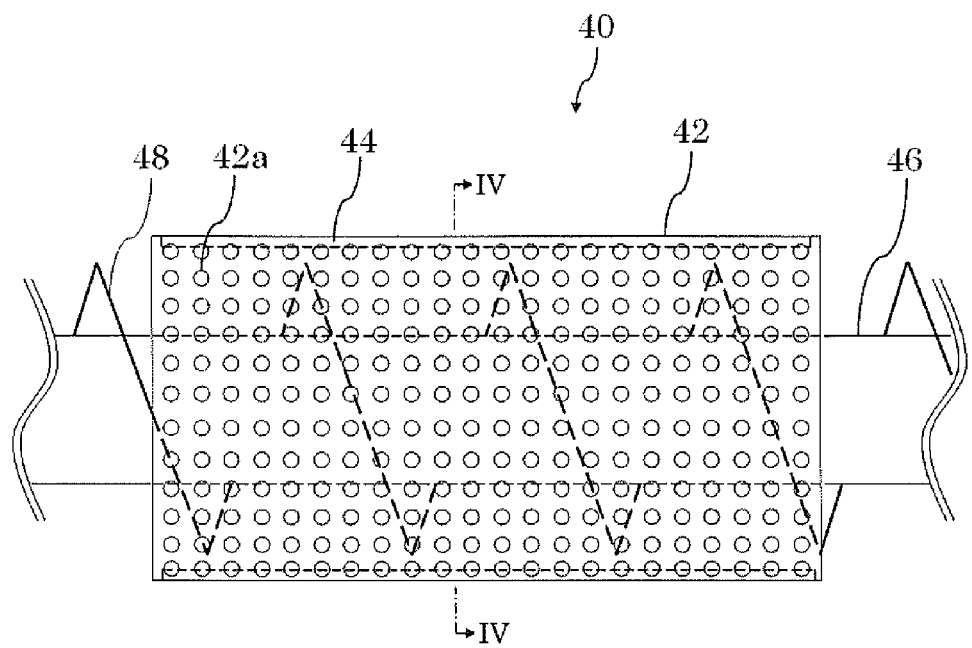
FIG. 3 is a side view showing a separation unit 40 of the separation device in FIG. 2.

The structure of the separation unit 40 will be described with reference to FIGS. 3 and 4. FIG. 3 is a side view showing the separation unit 40. FIG. 4 is a cross-sectional view taken along line IV-IV in FIG. 3. The separation unit 40 has a drum 42 (first tubular portion). The drum 42 has a substantially cylindrical tubular shape and is provided so as to be rotatable about its central axis. The central axis of the drum 42 extends horizontally. The inner diameter of the drum 42 may be between 30 cm and 50 cm inclusive, for example.

A large number of holes 42a (first holes) are formed in the drum 42. The holes 42a are formed over substantially the entire drum 42. The holes 42a do not allow the plastic contained in the sanitary article shredded by the shredding unit 30 to pass through, but allow the fluff pulp and the water-absorbent polymer to pass through. In the case where the sanitary article is a disposable diaper, for example, it is preferable that the diameter of the holes 42a is between 10 mm and 30 mm inclusive. The separation unit 40 rotates the drum 42 in a state in which the sanitary article shredded by the shredding unit 30 is accommodated therein, thereby separating the fluff pulp and the water-absorbent polymer passing through the holes 42a from the sanitary article.

A ridge 44 (first ridge) is formed on an inner circumferential surface of the drum 42. The ridge 44 extends in a direction in which the central axis of the drum 42 extends. The ridge 44 extends over substantially the entire path from an inlet side (left side of FIG. 3) to an outlet side (right side of FIG. 3) of the drum 42. Also, the ridge 44 has a substantially triangular cross-sectional shape. The height (length in the radial direction of the drum 42) of the ridge 44 may be between 5 mm and 2 cm inclusive, for example. Preferably, "p" (p: an integer between 3 and 5 inclusive) ridges 44 are provided. The "p" ridges 44 are arranged on the inner circumferential surface of the drum 42 at regular intervals. That is so say, in a cross section (cross section shown in FIG. 4) that is perpendicular to the central axis of the drum 42, an angle a that is formed by a line connecting one ridge 44 to the central axis and a line connecting the next ridge 44 to the central axis is substantially equal to 360°/p. In the present embodiment, p=4 and α=90°.

A rotating rod 46 and a screw member 48 are provided inside the drum 42. The rotating rod 46 has a substantially cylindrical shape and is provided so as to be rotatable about its central axis. The central axis of the rotating rod 46 coincides with the central axis of the drum 42. However, the rotating rod 46 rotates independently of the drum 42. The outer diameter of the rotating rod 46 may be between 15 cm and 25 cm inclusive, for example.

The screw member 48 is helically provided around the rotating rod 46. The screw member 48 is fixed to the rotating rod 46 and rotates together with the rotating rod 46. A plurality of teeth 49 are formed in the screw member 48. An end portion of each tooth 49 is constituted by a side 49a and a side 49b in a front view (see FIG. 4).

The side 49a extends in the radial direction of the drum 42 and the rotating rod 46. An inner end (end that is closer to the rotating rod 46) of the side 49a is located at a position spaced apart from the rotating rod 46. Similarly, an outer end (end that is closer to the drum 42) of the side 49a is located at a position spaced apart from the drum 42. The distance from the outer end of the side 49a to the inner circumferential surface of the drum 42 is larger than the height of the ridge 44 and may be between 1 cm and 3 cm inclusive, for example. The side 49b connects the outer end of the side 49a to the inner end of the side 49a of the next tooth 49. The side 49b is longer than the side 49a. The ratio of the length of the side 49b to the length of the side 49a may be between 2 and 2.5 inclusive, for example.

The rotating rod 46 and the screw member 48 rotate in a left-handed direction (counterclockwise) in FIG. 4. That is to say, in each tooth 49, the side 49b is located on the forward side with respect to the rotation direction, and the side 49a is located on the rearward side with respect to the rotation direction. The rotation direction of the drum 42 described above may be the same as the rotation direction of the rotating rod 46 and the screw member 48 or may be opposite to this rotation direction. In the case where these rotation directions are the same, it is preferable that the rotation speed of the rotating rod 46 and the screw member 48 is greater than the rotation speed of the drum 42.

The separation unit 92 separates the fluff pulp and the water-absorbent polymer, which are separated from the sanitary article by the separation unit 40, from each other. Such separation may be performed, for example, by a method of jetting air to a mixture of the fluff pulp and the water-absorbent polymer. This method utilizes the difference in specific gravity between the fluff pulp and the water-absorbent polymer. Specifically, the fluff pulp and the water-absorbent polymer are separated from each other by jetting air with such a strength that only the fluff pulp of the fluff pulp and the water-absorbent polymer is blown off.

The shredding unit 50 shreds the sanitary article from which the fluff pulp and the water-absorbent polymer passing through the holes 42a have been separated by the separation unit 40. For example, a crusher or a grinder can be used as the shredding unit 50. A screen is provided in the shredding unit 50. In the case where the sanitary article is a disposable diaper, for example, it is preferable that the hole diameter of the screen is between 30 mm and 70 mm inclusive, for example.

Figure 5:
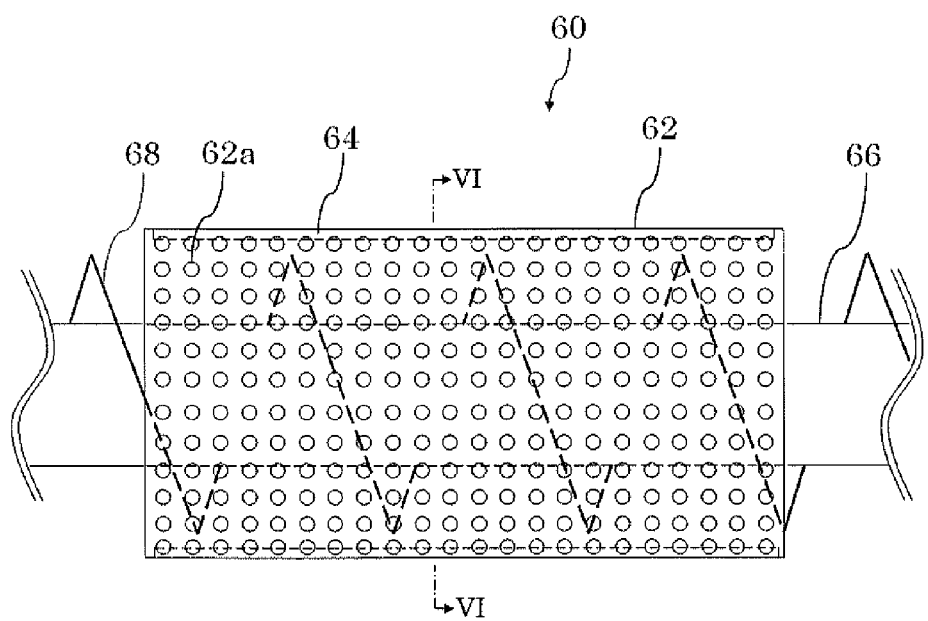
FIG. 5 is a side view showing a separation unit 60 of the separation device in FIG. 2.
Figure 6:
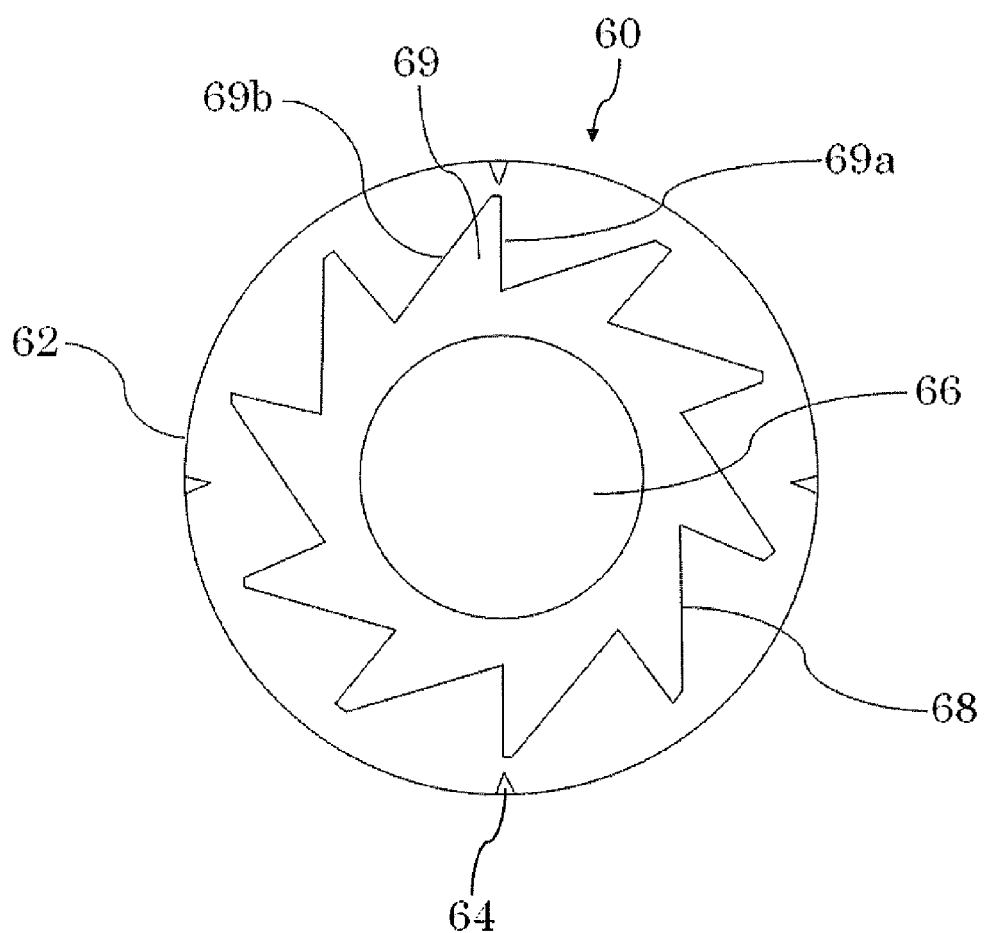
FIG. 6 is a cross-sectional view taken along line VI-VI in FIG. 5.

The structure of the separation unit 60 will be described with reference to FIGS. 5 and 6. FIG. 5 is a side view showing the separation unit 60. FIG. 6 is a cross-sectional view taken along line VI-VI in FIG. 5. The separation unit 60 has a drum 62 (second tubular portion). The drum 62 has a substantially cylindrical tubular shape and is provided so as to be rotatable about its central axis. The central axis of the drum 62 extends horizontally. The inner diameter of the drum 62 may be between 30 cm and 50 cm inclusive, for example.

A large number of holes 62a (second holes) are formed in the drum 62. The holes 62a are formed over substantially the entire drum 62. The holes 62a do not allow the plastic contained in the sanitary article shredded by the shredding unit 50 to pass through, but allow the fluff pulp and the water-absorbent polymer to pass through. The area of each of the holes 62a in a plan view is smaller than the area of each of the holes 42a in a plan view. In the case where the sanitary article is a disposable diaper, for example, it is preferable that the diameter of the holes 62a is between 5 mm and 20 mm inclusive. The separation unit 60 rotates the drum 62 in a state in which the sanitary article shredded by the shredding unit 50 is accommodated therein, thereby separating the fluff pulp and the water-absorbent polymer passing through the holes 62a from the sanitary article.

A ridge 64 (second ridge) is formed on an inner circumferential surface of the drum 62. The ridge 64 extends in a direction in which the central axis of the drum 62 extends. The ridge 64 extends over substantially the entire path from an inlet side (left side of FIG. 5) to an outlet side (right side of FIG. 5) of the drum 62. Also, the ridge 64 has a substantially triangular cross-sectional shape. The height (length in the radial direction of the drum 62) of the ridge 64 may be between 5 Trim and 2 cm inclusive, for example. Preferably, "q" (q: an integer between 3 and 5 inclusive) ridges 64 are provided. The "q" ridges 64 are arranged on the inner circumferential surface of the drum 62 at regular intervals. That is to say, in a cross section (cross section shown in FIG. 6) that is perpendicular to the central axis of the drum 62, an angle 6 that is formed by a line connecting one ridge 64 to the central axis and a line connecting the next ridge 64 to the central axis is substantially equal to 360°/q. In the present embodiment, q=4 and β=90°.

A rotating rod 66 and a screw member 68 are provided inside the drum 62. The rotating rod 66 has a substantially cylindrical shape and is provided so as to be rotatable about its central axis. The central axis of the rotating rod 66 coincides with the central axis of the drum 62. However, the rotating rod 66 rotates independently of the drum 62. The outer diameter of the rotating rod 66 may be between 15 cm and 25 cm inclusive, for example.

The screw member 68 is helically provided around the rotating rod 66. The screw member 68 is fixed to the rotating rod 66 and rotates together with the rotating rod 66. A plurality of teeth 69 are formed in the screw member 68. An end portion of each tooth 69 is constituted by a side 69a and a side 69b in a front view (see FIG. 6).

The side 69a extends in the radial direction of the drum 62 and the rotating rod 66. An inner end (end that is closer to the rotating rod 66) of the side 69a is located at a position spaced apart from the rotating rod 66. Similarly, an outer end (end that is closer to the drum 62) of the side 69a is located at a position spaced apart from the drum 62. The distance from the outer end of the side 69a to the inner circumferential surface of the drum 62 is larger than the height of the ridge 64 and may be between 1 cm and 3 cm inclusive, for example. The side 69b connects the outer end of the side 69a to the inner end of the side 69a of the next tooth 69. The side 69b is longer than the side 69a. The ratio of the length of the side 69b to the length of the side 69a may be between 2 and 2.5 inclusive, for example.

The rotating rod 66 and the screw member 68 rotate in a left-handed direction (counterclockwise) in FIG. 6. That is to say, in each tooth 69, the side 69b is located on the forward side with respect to the rotation direction, and the side 69a is located on the rearward side with respect to the rotation direction. The rotation direction of the drum 62 described above may be the same as the rotation direction of the rotating rod 66 and the screw member 68 or may be opposite to this rotation direction. In the case where these rotation directions are the same, it is preferable that the rotation speed of the rotating rod 66 and the screw member 68 is greater than the rotation speed of the drum 62.

The separation unit 94 separates the fluff pulp and the water-absorbent polymer, which are separated from the sanitary article by the separation unit 60, from each other. Such separation may be performed by the same method as the separation unit 92 described above.

The separation device 90 is further provided with a transfer path 76, a transfer path 78, a transfer path 80, a transfer path 93, and a transfer path 95 (see FIG. 2). The transfer path 76 is a duct (first air pipe) and transfers the sanitary article after shredding by the shredding unit 30 to the separation unit 40 with air pressure. The transfer path 78 is a duct (second air pipe) and transfers the sanitary article after separation by the separation unit 40 to the shredding unit 50 with air pressure. The transfer path 80 is a duct (third air pipe) and transfers the sanitary article after shredding by the shredding unit 50 to the separation unit 60.

The transfer path 93 transfers the fluff pulp and the water-absorbent polymer that are separated from the sanitary article by the separation unit 40 to the separation unit 92. The transfer path 95 transfers the fluff pulp and the water-absorbent polymer that are separated from the sanitary article by the separation unit 60 to the separation unit 94. The transfer path 93 and the transfer path 95 are, for example, ducts that transfer the fluff pulp and the water-absorbent polymer with air pressure.

The structure of the transfer path 76 will be described with reference to FIG. 7. FIG. 7 is a cross-sectional view showing the transfer path 76. The transfer path 76 has a portion 76a (first portion) extending in a first direction, a portion 76b (second portion) extending in a second direction, and a portion 76c (third portion) extending in a third direction. In the present embodiment, the first direction is a horizontal direction, the second direction is a vertical direction, and the third direction is a horizontal direction. The portion 76b is connected to the portion 76a on a downstream side of the portion 76a. The portion 76c is connected to the portion 76b on the downstream side of the portion 76b. Thus, the portion 76a, the portion 76b, and the portion 76c constitute a single cranked duct. The inner diameter of the transfer path 76 may be between 10 cm and 20 cm inclusive, for example.

An uneven surface 77a (first uneven surface) is present in a connecting portion between the portion 76a and the portion 76b. The uneven surface 77a is provided at a position where the sanitary article that is transferred through the portion 76a collides with this uneven surface. The uneven surface 77a is at an angle of about 45° to a vertical plane. For example, a corrugated or embossed plate-like member can be used as the uneven surface 77a. The material for the uneven surface 77a may be aluminum, for example.

An uneven surface 77b (second uneven surface) is present in a connecting portion between the portion 76b and the portion 76c. The uneven surface 77b is provided at a position where the sanitary article that is transferred through the portion 76b collides with this uneven surface. The uneven surface 77b is at an angle of about 45° to a horizontal plane. For example, a corrugated or embossed plate-like member can be used as the uneven surface 77b. The material for the uneven surface 77b may be aluminum, for example.

Figure 8:
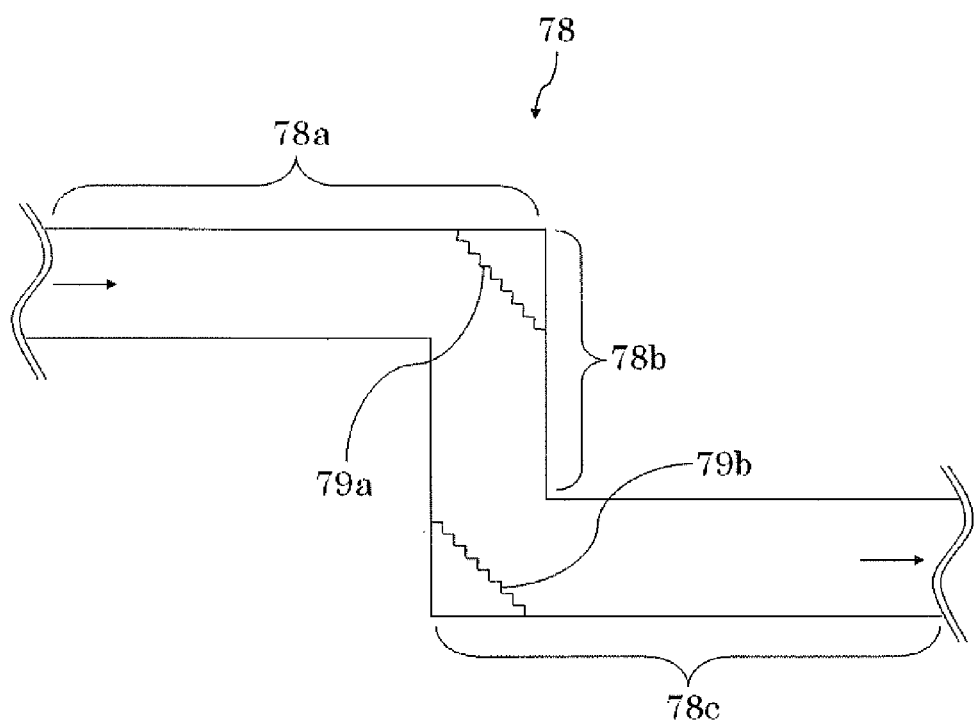

The structure of the transfer path 78 will be described with reference to FIG. 8. FIG. 8 is a cross-sectional view showing the transfer path 78. The transfer path 78 has a portion 78a (first portion) extending in a first direction, a portion 78b (second portion) extending in a second direction, and a portion 78c (third portion) extending in a third direction. In the present embodiment, the first direction is a horizontal direction, the second direction is a vertical direction, and the third direction is a horizontal direction. The portion 78b is connected to the portion 78a on the downstream side of the portion 78a. The portion 78c is connected to the portion 78b on the downstream side of the portion 78b. Thus, the portion 78a, the portion 78b, and the portion 78c constitute a single cranked duct. The inner diameter of the transfer path 78 may be between 10 cm and 20 cm inclusive, for example.

An uneven surface 79a (third uneven surface) is present in a connecting portion between the portion 78a and the portion 78b. The uneven surface 79a is provided at a position where the sanitary article that is transferred through the portion 78a collides with this uneven surface. The uneven surface 79a is at an angle of about 45° to a vertical plane. For example, a corrugated or embossed plate-like member can be used as the uneven surface 79a. The material for the uneven surface 79a may be aluminum, for example.

An uneven surface 79b (fourth uneven surface) is present in a connecting portion between the portion 78b and the portion 78c. The uneven surface 79b is provided at a position where the sanitary article that is transferred through the portion 78b collides with this uneven surface. The uneven surface 79b is at an angle of about 45° to a horizontal plane. For example, a corrugated or embossed plate-like member can be used as the uneven surface 79b. The material for the uneven surface 79b may be aluminum, for example.

The structure of the transfer path 80 will be described with reference to FIG. 9. FIG. 9 is a cross-sectional view showing the transfer path 80. The transfer path 80 has a portion 80a (first portion) extending in a first direction, a portion 80b (second portion) extending in a second direction, and a portion 80c (third portion) extending in a third direction. In the present embodiment, the first direction is a horizontal direction, the second direction is a vertical direction, and the third direction is a horizontal direction. The portion 80b is connected to the portion 80a on the downstream side of the portion 80a. The portion 80c is connected to the portion 80b on the downstream side of the portion 80b. Thus, the portion 80a, the portion 80b, and the portion 80c constitute a single cranked duct. The inner diameter of the transfer path 80 may be between 10 cm and 20 cm inclusive, for example.

An uneven surface 81a (fifth uneven surface) is present in a connecting portion between the portion 80a and the portion 80b. The uneven surface 81a is provided at a position where the sanitary article that is transferred through the portion 80a collides with this uneven surface. The uneven surface 81a is at an angle of about 45° to a vertical plane. For example, a corrugated or embossed plate-like member can be used as the uneven surface 81a. The material for the uneven surface 81a may be aluminum, for example.

An uneven surface 81b (sixth uneven surface) is present in a connecting portion between the portion 80b and the portion 80c. The uneven surface 81b is provided at a position where the sanitary article that is transferred through the portion 80b collides with this uneven surface. The uneven surface 81b is at an angle of about 45° to a horizontal plane. For example, a corrugated or embossed plate-like member can be used as the uneven surface 81b. The material for the uneven surface 81b may be aluminum, for example.

The operation of the separation device 90 will be described. A sanitary article, which is a processing target, is first shredded by the shredding unit 30. The sanitary article shredded by the shredding unit 30 is transferred to the separation unit 40 through the transfer path 76. The sanitary article transferred to the separation unit 40 is propelled from the inlet side (left side of FIG. 3) to the outlet side (right side of FIG. 3) of the drum 42 by the rotating screw member 48. Meanwhile, due to the centrifugal force and the like generated by the rotation of the drum 42, the fluff pulp and the water-absorbent polymer dissociated from the plastic are discharged to the outside of the drum 42 through the holes 42a. A mixture of the fluff pulp and the water-absorbent polymer thus obtained can be used as a raw material of the coating layer portion 20.

The fluff pulp and the water-absorbent polymer separated from the sanitary article by the separation unit 40 are transferred to the separation unit 92 through the transfer path 93. The fluff pulp and the water-absorbent polymer transferred to the separation unit 92 are separated from each other. The fluff pulp thus obtained can be used as a raw material of the coating layer portion 20, and can be used as a raw material of the granular core portion 10. The water-absorbent polymer thus obtained can be used as a raw material of the coating layer portion 20.

The sanitary article after separation by the separation unit 40 is transferred to the shredding unit 50 through the transfer path 78 and is further shredded. The sanitary article shredded by the shredding unit 50 is transferred to the separation unit 60 through the transfer path 80. The sanitary article transferred to the separation unit 60 is propelled from the inlet side (left side of FIG. 5) to the outlet side (right side of FIG. 5) of the drum 62 by the rotating screw member 68. Meanwhile, due to the centrifugal force and the like generated by the rotation of the drum 62, the fluff pulp and the water-absorbent polymer dissociated from the plastic are discharged to the outside of the drum 62 through the holes 62a. A mixture of the fluff pulp and the water-absorbent polymer thus obtained can be used as a raw material of the coating layer portion 20.

The fluff pulp and the water-absorbent polymer separated from the sanitary article by the separation unit 60 are transferred to the separation unit 94 through the transfer path 95. The fluff pulp and the water-absorbent polymer transferred to the separation unit 94 are separated from each other. The fluff pulp thus obtained can be used as a raw material of the coating layer portion 20, and can be used as a raw material of the granular core portion 10. The water-absorbent polymer thus obtained can be used as a raw material of the coating layer portion 20.

An example of a manufacturing method of the water absorbing material 1 will be described as an embodiment of a manufacturing method of a water absorbing material according to the present invention. This manufacturing method includes an obtaining step, a granulating step, a coating step, a classification step, and a drying step.

The obtaining step is a step of separating the water-absorbent polymer from the sanitary article to obtain the water-absorbent material consisting of at least one of the plastic and the fluff pulp. In this step, the separation device 90 described above is used. That is, in the obtaining step, a sanitary article is first shredded by the shredding unit 30 (first shredding step). Next, the drum 42 is rotated in a state in which the sanitary article shredded by the shredding unit 30 is accommodated therein, and thereby the fluff pulp and the water-absorbent polymer passing through the holes 42a are separated from the sanitary article in the separation unit 40 (first rough separating step). Subsequently, the fluff pulp and the water-absorbent polymer separated from the sanitary article by the separation unit 40 are separated from each other in the separation unit 92 (first fine separating step).

After that, the sanitary article from which the fluff pulp and the water-absorbent polymer are separated in the first rough separating step is further shredded by the shredding unit 50 (second shredding step). Next, the drum 62 is rotated in a state in which the sanitary article shredded by the shredding unit 50 is accommodated therein, and thereby the fluff pulp and the water-absorbent polymer passing through the holes 62a are separated from the sanitary article in the separation unit 60 (second rough separating step). Subsequently, the fluff pulp and the water-absorbent polymer separated from the sanitary article by the separation unit 60 are separated from each other in the separation unit 94 (second fine separating step).

The granulating step is a step of granulating the water-absorbent material obtained in the obtaining step. In this step, a core portion material (material that constitutes the granular core portion 10) containing the water-absorbent material is subjected to extrusion granulation using a granulator after adding water thereto. It should be noted that the core portion material may consist only of the water-absorbent material, or may consist of a mixture of the water-absorbent material and other materials. Thus, the granular core portion 10 is formed.

The coating step is a step of coating a granule (the granular core portion 10) granulated in the granulating step with a coating material (material that constitutes the coating layer portion 20). In this step, the coating material is stuck to the surface of the granular core portion 10 using a coating device and the like. Sticking of the coating material may be performed by, for example, sprinkling or spraying. Thus, the coating layer portion 20 is formed.

The coating material contains the fluff pulp and the water-absorbent polymer that are separated from the sanitary article. The fluff pulp and the water-absorbent polymer contained in the coating material may be separated from each other, or may not be separated from each other. The fluff pulp and the water-absorbent polymer that are separated from each other may be those obtained in either of the first fine separating step or the second fine separating step, or may be those obtained in both of the first and second fine separating steps. The fluff pulp and the water-absorbent polymer that are not separated from each other may be those obtained in either of the first rough separating step or the second rough separating step, or may be those obtained in both of the first and second rough separating steps. It should be noted that the coating material may consist only of the fluff pulp and the water-absorbent polymer separated from the sanitary article, or may consist of a mixture of these materials and other materials.

The coating step may include a pulverizing step of pulverizing the fluff pulp and the water-absorbent polymer contained in the coating material such that each of them has a predetermined grain size. In the pulverizing step, the fluff pulp is preferably pulverized so as to have a grain size of under 1 mm, and the water-absorbent polymer is preferably pulverized so as to have a grain size of under 35 μm. In the case where the pulverizing step is provided, the fluff pulp and the water-absorbent polymer are each pulverized with a grinder and the like after being separated from each other. Then, the coating layer portion 20 is formed using the coating material containing the pulverized fluff pulp and water-absorbent polymer.

In the classification step, only the water absorbing materials that meet a predetermined standard are obtained by sifting the water absorbing materials manufactured in the preceding step with a sieve having a predetermined mesh size.

In the drying step, the water absorbing materials obtained in the preceding step are dried by a dryer. By appropriately adjusting the moisture content of the granular core portion 10, it is possible to prevent degradation of water absorbing performance caused by movement of water from the granular core portion 10 to the coating layer portion 20, and to prevent the growth of mold and the like during storage of the water absorbing material 1. Accordingly, the water absorbing material 1 is obtained.

The effects of the present embodiment will be described. In the present embodiment, the water-absorbent material consisting of at least one of plastic and fluff pulp that are obtained by separating a water-absorbent polymer from a sanitary article is employed. Thus, the water-absorbent material can be obtained from a waste sanitary article, and therefore it is possible to reduce procuring cost of raw materials and eventually reduce manufacturing cost of the water absorbing material 1. In particular, because the water-absorbent material is used as the main material of the water absorbing material 1, the effect of reducing procuring cost of raw materials is remarkably exhibited. Moreover, because the weight ratio of the water-absorbent polymer remaining on the water-absorbent material is only 3% or less, it is possible to prevent deterioration in quality of the water absorbing material 1.

In contrast, in the case where a lot of water-absorbent polymers adhere to the water-absorbent material, the water absorbing material 1 after absorbing water in use is liable to break from inside because the swell of the water-absorbent polymers excessively occurs. If such breaking occurs, there are problems that the water absorbing materials 1 hardly adhere to each other, which prevents forming an aggregate, and that a calorific value in incinerating used water absorbing materials 1 increases.

The water absorbing material 1 has a multilayer structure consisting of the granular core portion 10 and the coating layer portion 20, and the coating layer portion 20 contains the fluff pulp and the water-absorbent polymer that are separated from the sanitary article, Thus, the raw materials of the coating layer portion 20 can also be obtained from a waste sanitary article, which contributes to reduction of procuring cost of raw materials.

In the case where the water-absorbent polymer contained in the coating layer portion 20 is pulverized so as to have a grain size of under 35 μm, adhesion of the water-absorbent polymer is enhanced whereas water absorbability thereof is degraded. Accordingly, it is possible to suppress the swell of the water-absorbent polymer in use and improve the aggregate making function of the coating layer portion 20.

In the present embodiment, after shredding by the shredding unit 30 and rough separation by the separation unit 40, shredding by the shredding unit 50 and rough separation by the separation unit 60 are performed.

Therefore, the separation efficiency is improved when compared with the case where shredding and rough separation are performed only one time. Here, the separation efficiency refers to the ratio of the weight of the second and third materials that are separated from the processing target to the weight of the second and third materials that are contained in the processing target immediately before the processing.

The drum 42 is provided with the ridges 44. If the ridges 44 are not provided, the sanitary article tends to collect in a lower portion of the drum 42 due to the effect of gravity. In contrast, in the present embodiment, the sanitary article in the drum 42 is scooped up by the ridges 44 and thus easily reaches an upper portion of the drum 42. Therefore, the sanitary article is distributed over a wide range of the inner circumferential surface of the drum 42, so that separation by the separation unit 40 is promoted. Moreover, dissociation of the fluff pulp and the water-absorbent material from the plastic is promoted by the impact of the sanitary article when falling down from the upper portion of the drum 42. Furthermore, the ridges 44 become obstacles when the sanitary article is propelled by the screw member 48, and thus the time for which the sanitary article stays in the drum 42 is prolonged. Thus, a larger amount of fluff pulp and water-absorbent material can be separated from the sanitary article.

The screw member 48 is provided inside the drum 42. The sanitary article in the drum 42 is beaten and rubbed against the inner circumferential surface of the drum 42 by the screw member 48. The impact and the frictional force at that time promote dissociation of the fluff pulp and the water-absorbent material from the plastic. Moreover, since the ridges 44 are provided, the sanitary article may be beaten and rubbed against the inner circumferential surface of the drum 42 by the screw member 48 in a state in which the sanitary article is caught on the ridges 44. In that case, forces are focused, so that the impact and the frictional force that are applied to the sanitary article increase, and accordingly dissociation of the fluff pulp and the water-absorbent material from the plastic is promoted even more.

The screw member 48 rotates with the side 49b that forms an obtuse angle with the rotation direction (direction of the tangent to the rotating rod 46), rather than the side 49a that forms an approximately right angle with the rotation direction, being located on the forward side (see FIG. 4). Thus, the sanitary article can be prevented from being excessively caught on the teeth 49 of the screw member 48.

The drum 62 is provided with the ridges 64. If the ridges 64 are not provided, the sanitary article tends to collect in a lower portion of the drum 62 due to the effect of gravity. In contrast, in the present embodiment, the sanitary article in the drum 62 is scooped up by the ridges 64 and thus easily reaches an upper portion of the drum 62. Therefore, the sanitary article is distributed over a wide range of the inner circumferential surface of the drum 62, so that separation by the separation unit 60 is promoted. Moreover, dissociation of the fluff pulp and the water-absorbent material from the plastic is promoted by the impact of the sanitary article when falling down from the upper portion of the drum 62. Furthermore, the ridges 64 become obstacles when the sanitary article is propelled by the screw member 68, and thus the time for which the sanitary article stays in the drum 62 is prolonged. Thus, a larger amount of fluff pulp and water-absorbent material can be separated from the sanitary article.

The screw member 68 is provided inside the drum 62. The sanitary article in the drum 62 is beaten and rubbed against the inner circumferential surface of the drum 62 by the screw member 68. The impact and the frictional force at that time promote dissociation of the fluff pulp and the water-absorbent material from the plastic. Moreover, since the ridges 64 are provided, the sanitary article may be beaten and rubbed against the inner circumferential surface of the drum 62 by the screw member 68 in a state in which the sanitary article is caught on the ridges 64. In that case, forces are focused, so that the impact and the frictional force that are applied to the sanitary article increase, and accordingly dissociation of the fluff pulp and the water-absorbent material from the plastic is promoted even more.

The screw member 68 rotates with the side 69b that forms an obtuse angle with the rotation direction (direction of the tangent to the rotating rod 66), rather than the side 69a that forms an approximately right angle with the rotation direction, being located on the forward side (see FIG. 6). Thus, the sanitary article can be prevented from being excessively caught on the teeth 69 of the screw member 68.

The transfer path 76 has the portion 76*a* and the portion 76*b* that are orthogonal to each other (see FIG. 7). Thus, the sanitary article transferred by air pressure collides with the inner surface of the transfer path 76 in the connecting portion between the portion 76*a* and the portion 76*b*. The impact of this collision promotes dissociation of the fluff pulp and the water-absorbent material from the plastic. Furthermore, the transfer path 76 has the portion 76*c* that is orthogonal to the portion 76*b*. Thus, the sanitary article transferred by air pressure also collides with the inner surface of the transfer path 76 in the connecting portion between the portion 76*b* and the portion 76*c*. The impact of this collision promotes dissociation of the fluff pulp and the water-absorbent material from the plastic.

The uneven surface 77*a* is present in the connecting portion between the portion 76*a* and the portion 76*b*. When colliding with the uneven surface 77*a*, the sanitary article is subjected to a stronger impact than in the case where it collides with a flat surface. Therefore, dissociation of the fluff pulp and the water-absorbent material from the plastic is promoted even more. Furthermore, the uneven surface 77*b* is present in the connecting portion between the portion 76*b* and the portion 76*c*. When colliding with the uneven surface 77*b*, the sanitary article is subjected to a stronger impact than in the case where it collides with a flat surface. Therefore, dissociation of the fluff pulp and the water-absorbent material from the plastic is promoted even more.

The transfer path 78 has the portion 78*a* and the portion 78*b* that are orthogonal to each other (see FIG. 8). Thus, the sanitary article transferred by air pressure collides with the inner surface of the transfer path 78 in the connecting portion between the portion 78*a* and the portion 78*b*. The impact of this collision promotes dissociation of the fluff pulp and the water-absorbent material from the plastic. Furthermore, the transfer path 78 has the portion 78*c* that is orthogonal to the portion 78*b*. Thus, the sanitary article transferred by air pressure also collides with the inner surface of the transfer path 78 in the connecting portion between the portion 78*b* and the portion 78*c*. The impact of this collision promotes dissociation of the fluff pulp and the water absorbent material from the plastic.

The uneven surface 79*a* is present in the connecting portion between the portion 78*a* and the portion 78*b*. When colliding with the uneven surface 79*a*, the sanitary article is subjected to a stronger impact than in the case where it collides with a flat surface. Therefore, dissociation of the fluff pulp and the water-absorbent material from the plastic is promoted even more. Furthermore, the uneven surface 79*b* is present in the connecting portion between the portion 78*b* and the portion 78*c*. When colliding with the uneven surface 79*b*, the sanitary article is subjected to a stronger impact than in the case where it collides with a flat surface. Therefore, dissociation of the fluff pulp and the water-absorbent material from the plastic is promoted even more.

The transfer path 80 has the portion 80*a* and the portion 80*b* that are orthogonal to each other (see FIG, 9). Thus, the sanitary article transferred by air pressure collides with the inner surface of the transfer path 80 in the connecting portion between the portion 80*a* and the portion 80*b*. The impact of this collision promotes dissociation of the fluff pulp and the water-absorbent material from the plastic. Furthermore, the transfer path 80 has the portion 80*c* that is orthogonal to the portion 80*b*. Thus, the sanitary article transferred by air pressure also collides with the inner surface of the transfer path 80 in the connecting portion between the portion 80*b* and the portion 80*c*. The impact of this collision promotes dissociation of the fluff pulp and the water-absorbent material from the plastic.

The uneven surface 81*a* is present in the connecting portion between the portion 80*a* and the portion 80*b*. When colliding with the uneven surface 81*a*, the sanitary article is subjected to a stronger impact than in the case where it collides with a flat surface. Therefore, dissociation of the fluff pulp and the water-absorbent material from the plastic is promoted even more. Furthermore, the uneven surface 81*b* is present in the connecting portion between the portion 80*b* and the portion 80*c*. When colliding with the uneven surface 81*b*, the sanitary article is subjected to a stronger impact than in the case where it collides with a flat surface. Therefore, dissociation of the fluff pulp and the water-absorbent material from the plastic is promoted even more.

The water absorbing material and the manufacturing method thereof according to the present invention are not limited to the foregoing embodiments, and various modifications can be made thereto. For example, in the foregoing embodiments, an example in which the water-absorbent material is the main material of the water absorbing material 1 has been described. However, the water-absorbent material is not necessarily contained as the main material as long as it is contained in the water absorbing material 1.

In the foregoing embodiments, an example in which the water absorbing material 1 has a multilayer structure consisting of the granular core portion 10 and the coating layer portion 20 has been described.

However, it is also possible that the water absorbing material 1 has a single-layer structure consisting of the granular core portion 10.

In the foregoing embodiments, an example in which shredding and rough separation are performed two times has been described. However, it is also possible that shredding and rough separation are performed only one time, or three times or more.

In the foregoing embodiments, an example in which the drum 42 has a cylindrical tubular shape has been described. However, it is also possible that the drum 42 has a tapered shape. The same applies to the drum 62.

In the foregoing embodiments, an example in which the central axis of the drum 42 extends horizontally has been described. However, it is also possible that the central axis of the drum 42 is sloped downward from the inlet side toward the outlet side. The same applies to the drum 62.

In the foregoing embodiments, an example in which the holes 42*a* are formed over substantially the entire drum 42 has been described. However, it is also possible that the holes 42*a* are formed in only a portion of the drum 42. Moreover, it is also possible that the holes 42*a* are formed by forming substantially the whole or a portion of the drum 42 in a mesh form. That is to say, in this case, the meshes of the drum 42 correspond to the holes 42*a*. The same applies to the holes 62*a*.

In the foregoing embodiments, an example in which the ridges 44 extend over the entire path from the inlet side to the outlet side of the drum 42 has been described. However, it is also possible that the ridges 44 extend in only a portion of the path from the inlet side to the outlet side of the drum 42. The same applies to the ridges 64.

In the foregoing embodiments, the ridges 44 having a substantially triangular cross-sectional shape have been described as an example. However, it is also possible that the ridges 44 have a flat plate-like shape as shown in FIG. 10. The same applies to the ridges 64.

In the foregoing embodiments, an example in which four ridges 44 are provided on the inner circumferential surface of the drum 42 has been described. However, the number of ridges 44 can be set at any number greater than or equal to 1. The same applies to the ridges 64.

In the foregoing embodiments, an example in which the ridges 44 are provided on the inner circumferential surface of the drum 42 has been described. However, the provision of the ridges 44 is not necessarily required. The same applies to the ridges 64.

In the foregoing embodiments, an example in which the rotating rod 46 and the screw member 48 are provided inside the drum 42 has been described. However, the provision of the rotating rod 46 and the screw member 48 is not necessarily required. The same applies to the rotating rod 66 and the screw member 68.

In the foregoing embodiments, an example in which the uneven surface 77a is at a certain angle to a vertical plane has been described. However, it is also possible that the uneven surface 77a extends along a vertical plane as shown in FIG. 11. Moreover, it is also possible that the uneven surface 77a is realized by providing a protrusion P1 on the inner surface (position with which the sanitary article transferred through the portion 76a collides) of the transfer path 76 as shown in FIG. 12. The number of protrusions P1 may be one or may be two or more. The same applies to the uneven surface 79a and the uneven surface 81a.

In the foregoing embodiments, an example in which the uneven surface 77b is at a certain angle to a horizontal plane has been described. However, it is also possible that the uneven surface 77b extends along a horizontal plane as shown in FIG. 11. Moreover, it is also possible that the uneven surface 77b is realized by providing a protrusion P2 on the inner surface (position with which the sanitary article transferred through the portion 76b collides) of the transfer path 76 as shown in FIG. 12. The number of protrusions P2 may be one or may be two or more. The same applies to the uneven surface 79b and the uneven surface 81b.

In the foregoing embodiments, an example in which the uneven surface 77a is provided has been described. However, the provision of the uneven surface 77a is not necessarily required. The same applies to the uneven surface 79a and the uneven surface 81a.

In the foregoing embodiments, an example in which the uneven surface 77b is provided has been described. However, the provision of the uneven surface 77b is not necessarily required. The same applies to the uneven surface 79b and the uneven surface 81b.

In the foregoing embodiment, an example in which the transfer path 76 is constituted by a plurality of portions that are orthogonal to each other has been described (see FIG. 7). However, the transfer path 76 may be a straight line-shaped duct. The same applies to the transfer path 78 and the transfer path 80.

In the foregoing embodiment, an example in which the separation device 90 is provided with the separation unit 92 and the separation unit 94 has been described. However, in the case where only the plastic of the plastic and the fluff pulp is used as the water-absorbing material, the provision of the separation unit 92 and the separation unit 94 is not necessarily required.

In the foregoing embodiment, an example in which the fluff pulp and the water-absorbent material are separated from the sanitary article by the separation device 90 has been described. However, separation of the fluff pulp and the water-absorbent material from the sanitary article may be performed by other devices or methods.

In the foregoing embodiment, an example in which the water absorbing material is a granular excrement treatment material has been described. However, a water absorbing material according to the present invention may be, for example, a pet sheet, water stop material, water absorbing sheet, and so forth as long as it absorbs liquid.

LIST OF REFERENCE NUMERALS

1 Water absorbing material
10 Granular core portion
20 Coating layer portion
30 Shredding unit (first shredding unit)
40 Separation unit (first rough separation unit)
42 Drum (first tubular portion)
42a Hole (first hole)
44 Ridge (first ridge)
46 Rotating rod
48 Screw member
49 Tooth
50 Shredding unit (second shredding unit)
60 Separation unit (second rough separation unit)
62 Drum (second tubular portion)
62a Hole (second hole)
64 Ridge (second ridge)
66 Rotating rod
68 Screw member
69 Tooth
76 Transfer path (first air pipe)
77a Uneven surface (first uneven surface)
77b Uneven surface (second uneven surface)
78 Transfer path (second air pipe)
79a Uneven surface (third uneven surface)
79b Uneven surface (fourth uneven surface)
80 Transfer path (third air pipe)
81a Uneven surface (fifth uneven surface)
81b Uneven surface (sixth uneven surface)
90 Separation device
92 Separation unit (first fine separation unit)
93 Transfer path
94 Separation unit (second fine separation unit)
95 Transfer path

The invention claimed is:

1. A water absorbing material containing a water-absorbent material consisting of at least one of plastic and fluff pulp that are obtained by separating a water-absorbent polymer from a sanitary article containing the plastic, the fluff pulp and the water-absorbent polymer,
    wherein a weight ratio of the water-absorbent polymer adhering to the water-absorbent material with respect to the water-absorbent material is 3% or less.

2. The water absorbing material according to claim 1,
    wherein the water-absorbent polymer is separated from the sanitary article with a separation device, and
    the separation device includes:
    a first shredding unit that shreds the sanitary article; and
    a first rough separation unit that has a first tubular portion in which a large number of first holes that allow the fluff pulp and the water-absorbent polymer to pass through without allowing the plastic contained in the sanitary article shredded by the first shredding unit to pass through are formed, and that separates the fluff pulp and the water-absorbent polymer passing through the first holes from the sanitary article by rotating the first tubular portion in a state in which the sanitary article shredded by the first shredding unit is accommodated in the first tubular portion.

3. The water absorbing material according to claim 2,
wherein the separation device includes a first fine separation unit that separates the fluff pulp and the water-absorbent polymer, which are separated from the sanitary article by the first rough separation unit, from each other.

4. The water absorbing material according to claim 2,
wherein the separation device includes a first ridge that is provided on an inner circumferential surface of the first tubular portion and that extends in a direction in which a central axis of the first tubular portion extends.

5. The water absorbing material according to claim 4,
wherein "p" of said first ridges are present, "p" being an integer between 3 and 5 inclusive, and the "p" first ridges are arranged on the inner circumferential surface of the first tubular portion at regular intervals.

6. The water absorbing material according to claim 2,
wherein the separation device includes a first air pipe for transferring the sanitary article shredded by the first shredding unit to the first rough separation unit with air pressure, and
the first air pipe has a first portion that extends in a first direction and a second portion that is connected to the first portion on a downstream side of the first portion and that extends in a second direction substantially orthogonal to the first direction.

7. The water absorbing material according to claim 6,
wherein the separation device includes a first uneven surface that is present in a connecting portion between the first portion and the second portion of the first air pipe and with which the sanitary article transferred through the first portion collides.

8. The water absorbing material according to claim 6,
wherein the first air pipe has a third portion that is connected to the second portion on a downstream side of the second portion and that extends in a third direction substantially orthogonal to the second direction.

9. The water absorbing material according to claim 8,
wherein the separation device includes a second uneven surface that is present in a connecting portion between the second portion and the third portion of the first air pipe and with which the sanitary article transferred through the second portion collides.

10. The water absorbing material according to claim 2,
wherein the separation device includes:
a second shredding unit that shreds the sanitary article from which the fluff pulp and the water-absorbent polymer passing through the first holes are separated by the first rough separation unit; and
a second rough separation unit that has a second tubular portion in which a large number of second holes that allow the fluff pulp and the water-absorbent polymer to pass through without allowing the plastic contained in the sanitary article shredded by the second shredding unit to pass through are formed, and that separates the fluff pulp and the water-absorbent polymer passing through the second holes from the sanitary article by rotating the second tubular portion in a state in which the sanitary article shredded by the second shredding unit is accommodated in the second tubular portion.

11. The water absorbing material according to claim 10,
wherein the separation device includes a second fine separation unit that separates the fluff pulp and the water-absorbent polymer, which are separated from the sanitary article by the second rough separation unit, from each other.

12. The water absorbing material according to claim 10,
wherein an area of each of the second holes in a plan view is smaller than an area of each of the first holes in a plan view.

13. The water absorbing material according to claim 1, comprising:
a granular core portion containing the water-absorbent material; and
a coating layer portion that covers the granular core portion.

14. The water absorbing material according to claim 13,
wherein the coating layer portion contains the fluff pulp and the water-absorbent polymer.

15. The water absorbing material according to claim 1,
wherein the water-absorbent material is a main material of the water absorbing material.

16. A manufacturing method of a water absorbing material comprising:
an obtaining step of separating a water-absorbent polymer from a sanitary article containing plastic, fluff pulp and the water-absorbent polymer to obtain a water-absorbent material consisting of at least one of the plastic and the fluff pulp; and
a granulating step of granulating the water-absorbent material obtained in the obtaining step,
wherein in the obtaining step, the water-absorbent polymer is separated from the sanitary article so that a weight ratio of the water-absorbent polymer adhering to the water-absorbent material with respect to the water-absorbent material will be 3% or less.

17. The manufacturing method of the water absorbing material according to claim 16,
wherein the obtaining step includes:
a first shredding step of shredding the sanitary article; and
a first rough separating step of rotating a first tubular portion in which a large number of first holes that allow the fluff pulp and the water-absorbent polymer to pass through without allowing the plastic contained in the sanitary article shredded in the first shredding step to pass through are formed, the first tubular portion being rotated in a state in which the sanitary article shredded in the first shredding step is accommodated in the first tubular portion, thereby separating the fluff pulp and the water-absorbent polymer passing through the first holes from the sanitary article.

18. The manufacturing method of the water absorbing material according to claim 17,
wherein the obtaining step includes a first fine separating step of separating the fluff pulp and the water-absorbent polymer, which are separated from the sanitary article in the first rough separating step, from each other.

19. The manufacturing method of the water absorbing material according to claim 17,
wherein the obtaining step includes:
a second shredding step of shredding the sanitary article from which the fluff pulp and the water-absorbent polymer passing through the first holes are separated in the first rough separating step; and
a second rough separating step of rotating a second tubular portion in which a large number of second holes that allow the fluff pulp and the water-absorbent polymer to pass through without allowing the plastic contained in the sanitary article shredded in the second shredding step to pass through are formed, the second tubular portion being rotated in a state in which the sanitary article shredded in the second shredding step is accommodated in the second tubular portion, thereby separating the fluff pulp and the water-absorbent polymer passing through the second holes from the sanitary article.

20. The manufacturing method of the water absorbing material according to claim 19,
wherein the obtaining step includes a second fine separating step of separating the fluff pulp and the water-absorbent polymer, which are separated from the sanitary article in the second rough separating step, from each other.

* * * * *